United States Patent [19]
Bilinski et al.

[11] Patent Number: 5,545,892
[45] Date of Patent: Aug. 13, 1996

[54] GYRO SENSOR COIL WITH LOW-FRICTION HUB INTERFACE

[75] Inventors: Donald J. Bilinski, Northridge; Gene H. Chin, Los Angeles; Amado Cordova, West Hills; Samuel N. Fersht, Studio City, all of Calif.

[73] Assignee: Litton Systems, Inc., Woodland Hills, Calif.

[21] Appl. No.: 299,585

[22] Filed: Sep. 1, 1994

[51] Int. Cl.$^6$ .............................. G01D 5/34; G01B 9/02
[52] U.S. Cl. .............................. 250/231.12; 250/227.19; 250/227.27; 356/345; 385/128
[58] Field of Search .............................. 250/227.19, 227.14, 250/227.17, 227.27, 231.12; 356/350, 351, 345; 385/12, 13, 115, 128, 134; 242/613

[56] References Cited

U.S. PATENT DOCUMENTS

| | | | |
|---|---|---|---|
| 4,793,708 | 12/1988 | Bednarz | 356/350 |
| 4,856,900 | 8/1989 | Ivancevic | 356/350 |
| 4,883,337 | 11/1989 | Dahlgren | 356/350 |
| 5,136,667 | 8/1992 | Ohno et al. | 385/13 |
| 5,205,510 | 4/1993 | Schotter . | |
| 5,245,687 | 9/1993 | Usui | 356/350 |
| 5,257,339 | 10/1993 | Darsey | 385/128 |
| 5,333,214 | 7/1994 | Huang et al. | 385/12 |
| 5,351,900 | 10/1994 | Torney | 356/350 |
| 5,371,593 | 12/1994 | Cordova et al. | 356/350 |

FOREIGN PATENT DOCUMENTS

| | | |
|---|---|---|
| 0521400 | 1/1993 | European Pat. Off. . |
| 626872 | 2/1994 | Japan ........ 356/351 |
| WO90/10244 | 9/1990 | WIPO . |

OTHER PUBLICATIONS

Article, N. Frigo, "Compensation of Linear Sources of Non-Reciprocity in Saganc Interferometers", Fiber Optics and Laser Sensors I, Procs. SPIE, v. 412, p. 261 (1989).

Primary Examiner—Stephone Allen
Attorney, Agent, or Firm—Elliott N. Kramsky

[57] ABSTRACT

A spool for receiving a fiber optic sensor coil includes a single, substantially-planar mounting flange and a central hub. The coil can be directly wound upon the hub. The coil is mounted transverse to the plane of the mounting flange and is unconfined in that direction as the surface of the hub is substantially non-adhesive with respect to the inner layer of the coil. This allows axial coil expansion with increases in temperature without generating gyro bias errors. The device is also substantially free from vibration-induced bias errors due to the relatively high resonant frequency (vis a vis environmental vibration) of the integral spool-plus-coil structure.

14 Claims, 3 Drawing Sheets

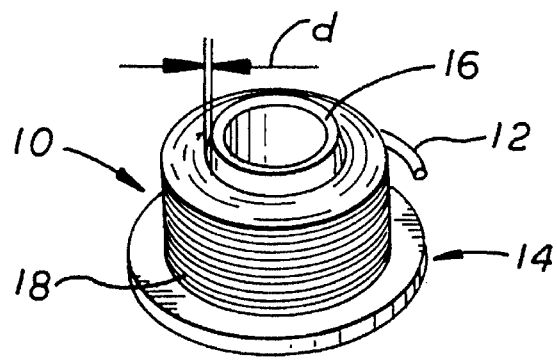
FIG. 1
PRIOR ART
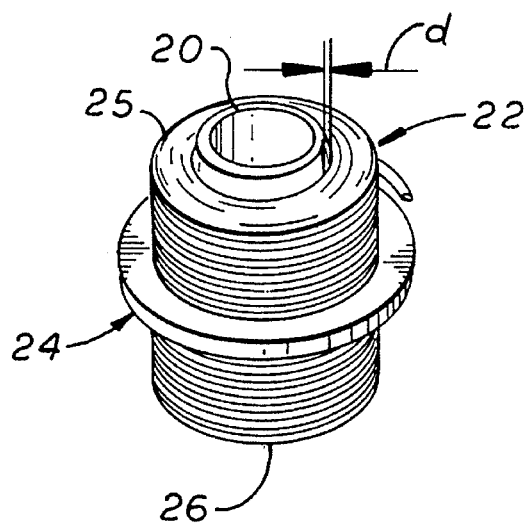
FIG. 2
PRIOR ART
FIG. 3
PRIOR ART
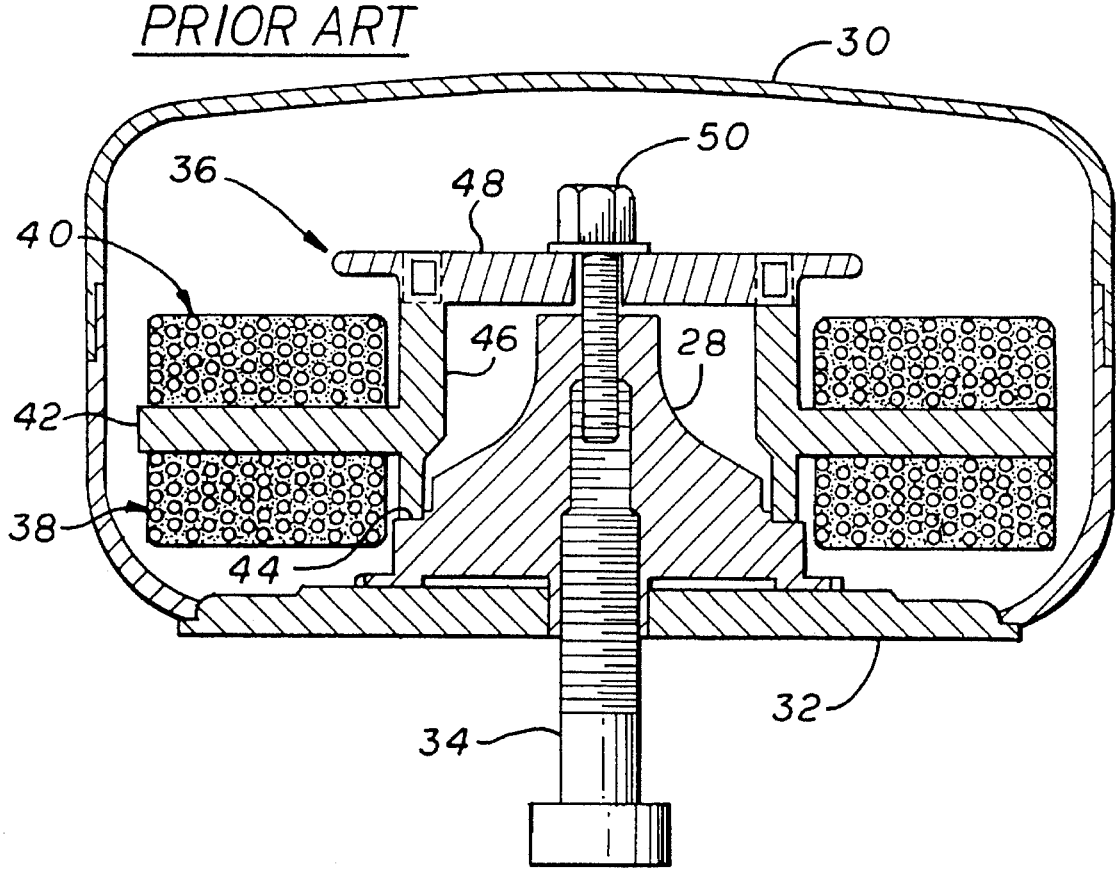

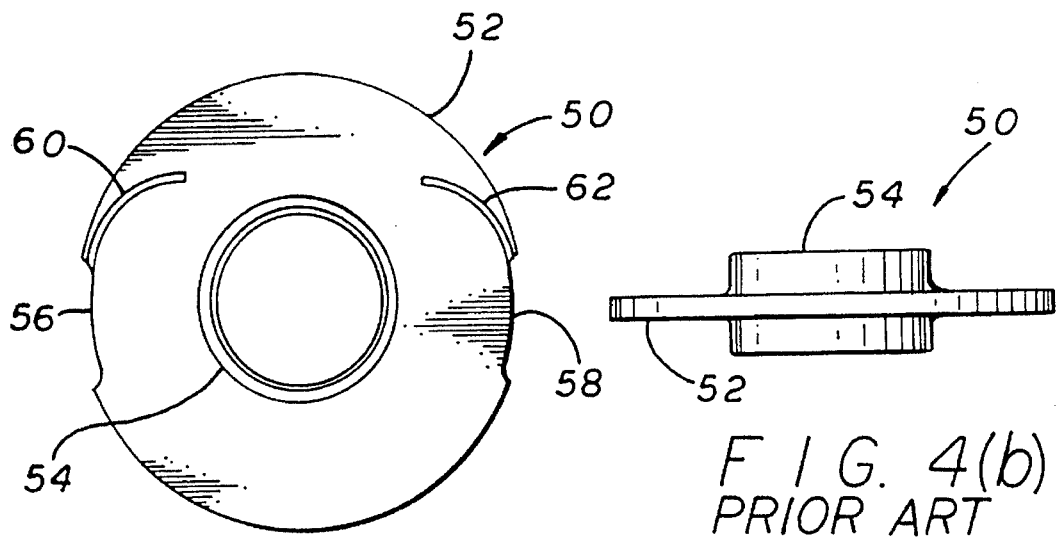
F I G. 4(a)
PRIOR ART
F I G. 4(b)
PRIOR ART
F I G. 5
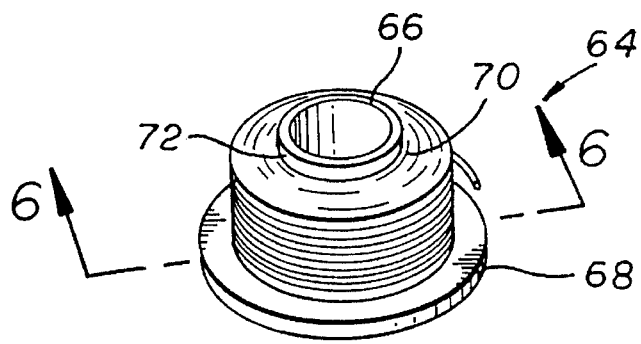
F I G. 6
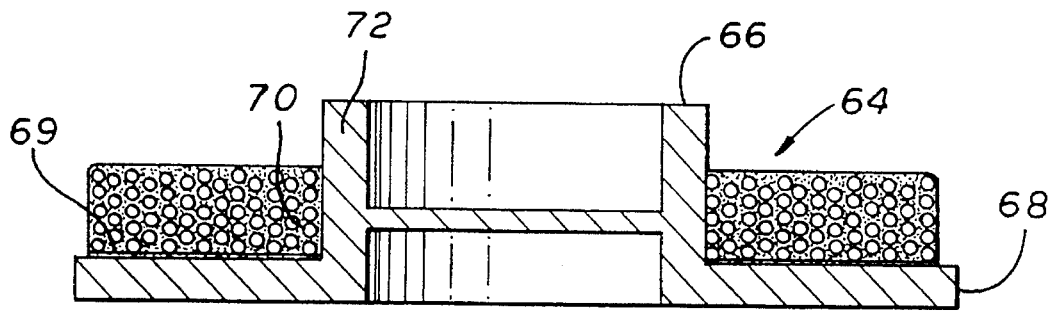

GYRO SENSOR COIL WITH LOW-FRICTION HUB INTERFACE

BACKGROUND

1. Field of the Invention

The present invention relates to sensor coils for fiber optic gyroscopes. More particularly, this invention pertains to an arrangement for supporting a potted sensor coil that minimizes temperature-induced Shupe effect due to fiber stressing.

2. Description of the Prior Art

A fiber optic gyroscope comprises the following main components: (1) a light source, (2) a beamsplitter (either a fiber optic directional coupler or an integrated-optics Y-junction), (3) a fiber optic coil, (4) a polarizer (and sometimes one or more depolarizers), and (5) a detector. Light from the light source is split by the beamsplitter into copropagating and counterpropagating waves that travel through the sensing coil. Associated electronics measures the phase relationships between the two interfering, counterpropagating beams of light that emerge from the opposite ends of the coil. The difference between the phase shifts experienced by the two beams provides a measure of the rate of rotation of the platform to which the instrument is fixed.

Environmental factors can affect the measured phase shift difference between the counterpropagating beams, thereby introducing a bias error. Such environmental factors include variables such as temperature, vibration (acoustical and mechanical) and magnetic fields. These are both time-varying and unevenly distributed throughout the coil and induce variations in index of refraction and length that each counterpropagating wave encounters as it travels through the coil. The phase shifts imposed upon the two waves due to environmental factors can be unequal, producing a net undesirable phase shift which is indistinguishable from the rotation-induced signal.

One approach to reducing the sensitivity arising from environmental factors has involved the use of symmetric coil winding configurations. In such coils, the windings are arranged so that the geometrical center of the winding is located at the innermost layer while the two ends of the coil are located at the outermost layers.

N. Frigo has proposed the use of particular winding patterns to compensate for non-reciprocities in "Compensation of Linear Sources of Non-Reciprocity in Sagnac Interferometers", *Fiber Optics and Laser Sensors I*, Procs. SPIE, v. 412, p.261 (1989). Furthermore, U.S. Pat. No. 4,793,708 of Bednarz entitled "Fiber Optic Sensing Coil" teaches a symmetric fiber optic sensing coil formed by duopole or quadrupole winding. The coils described in that patent exhibit enhanced performance over the conventional helix-type winding.

U.S. Pat. No. 4,856,900 of Ivancevic entitled "Quadruple-Wound Fiber Optic Sensing Coil and Method of Manufacture Thereof" teaches an improved quadrupole-wound coil in which fiber pinching and microbends due to the presence of pop-up fiber segments adjacent to end flanges are overcome by replacing such pop-up segments with concentrically-wound walls of turns that climb between connecting layers. Both of the aforementioned United States patents are the property of the assignee herein.

Pending patent application 08/017,678 of Huang et al. entitled "Apparatus For Reducing Magnetic Field-Induced Bias Errors in a Fiber Optic Gyroscope" addresses the suppression of bias errors induced by the Faraday effect in a sensor coil exposed to a magnetic field. The invention disclosed in that application (property of the assignee herein) teaches the use and design of compensator loops for counteracting the effects of both radially and axially-directed magnetic fields. In either case, a predetermined degree of twist of a preselected fiber twist mode is imposed upon the compensator loop to create a counteracting-corrective Faraday effect.

U.S. Pat. No. 5,371,593 of Cordova et al. entitled "Sensor Coil For Low Bias Fiber Optic Gyroscope", also property of the assignee herein, addresses additional problems related to environmental factors. While acknowledging that the design of the sensor coil can impact the gyro's random walk, bias stability, bias temperature sensitivity, bias temperature-ramp sensitivity, bias vibration sensitivity, bias magnetic sensitivity, scale factor temperature sensitivity, scale factor linearity and input axis temperature sensitivity, the device disclosed in that application discloses a coil for which windings are potted in an adhesive material of a predetermined composition. Careful selection of the potting material (particularly in terms of modulus of elasticity) results in reduction of vibration-induced bias, coil cracking, degradation of h-parameter and temperature-ramp bias sensitivity. The coil is formed on a spool of carbon composite material whose coefficient of thermal expansion approximates that of the overlying fiber windings. In addition, this application discloses that the close matching of the thermal expansion characteristics of the spool and the fiber windings as well as proper selection of the coil potting material will minimize the Shupe-like bias caused by thermal stress that would be otherwise exerted by a standard metallic spool.

While the use of adequate potting and spool materials will tend to minimize bias environmental sensitivities, conventional support and spool designs, which feature a substantially-cylindrical hub sandwiched between a pair of end flanges, are difficult to "match" to the potted coil. This is due to the asymmetry of expansions of such coils in response to temperature change. The coefficient of thermal expansion of a potted coil in the axial direction is often on the order of one-hundred (100) times that of the radial direction. Unfortunately, a corresponding asymmetry does not exist with regard to the supporting spool. Rather, spools of conventional design and material composition exhibit isotropic thermal expansion characteristics. This relative imbalance introduces bias errors through coil stressing and creates bonding and cracking problems. For example, in a spool-and-coil arrangement in which the material of the hub of the spool closely approximates the radial coefficient of thermal expansion of the potted coil, the axial expansion of the coil will exceed that of the hub. As a result, significant axial compression of the coil can occur when the temperature rises since axial expansion of the potted coil is limited by a relatively "fixed" separation distance between the spool's end flanges. Further, the stressing due to differential thermal expansion coefficients at the coil-hub interface can result in either rupture or in coil cracking. On the other hand, in a spool fabricated of material closely matching the axial coefficient of thermal expansion of the potted coil, one may expect the relatively-greater radial expansion of the hub in response to temperature change to degrade performance by squeezing the fiber of the coil whose radial dimension is relatively fixed.

Pending U.S. patent application Ser. No. 08/116,376 of Patterson entitled "Flange-Supported Sensor Coil For a Fiber Optic Gyroscope", property of the assignee herein, discloses a spool designed to address the thermally-induced Shupe bias that results from the abovementioned thermal incompatibility of conventional spool designs with the asymmetric radial and axial thermal expansion coefficients of potted sensor coils. That application discloses a spool that consists of a single mounting flange and an interior hub. The coil is mounted upon with axis transverse to the plane of the flange. In an alternative embodiment, the coil is split into sections that lie atop and at the bottom of the flange. The coil is free to expand axially because the interior of the coil is separated from the hub by a finite distance. The much smaller radial coefficient of thermal expansion of the coil assures that the separation from the hub needn't be excessive and that undue stressing is not experienced at the coil-flange interface. While the above device exhibits good thermal performance characteristics, it is subject to vibration-induced bias effects that result from the free-standing arrangement of the coil relative to the spool. Such bias effects can become particularly acute in an environment that includes vibrations at the resonant frequency of the potted coil.

SUMMARY OF THE INVENTION

The present invention addresses bias errors associated with the manner of mounting a sensor coil by providing a rotation sensor for use in a fiber optic gyroscope that includes a substantially planar mounting flange with a centrally-located cylindrical hub whose axis of rotation is orthogonal to the plane of the flange. A continuous optical fiber is wound upon the hub in a coil comprising a plurality of layers of coaxial turns. The hub has an outer surface that is substantially non-adhesive to the coil.

In a second aspect, a substantially cylindrical coil comprises a plurality of layers of coaxial turns of optical fiber embedded in a potting material. A spool is provided for mounting the coil and comprises a substantially-planar mounting flange having a centrally-positioned cylindrical hub whose axis of rotation is orthogonal to the plane of the flange. The interior of the coil is in contact with the outer surface of the hub and the outer surface of the hub is substantially non-adhesive to the coil.

In a third aspect, the present invention provides an improvement in a rotation sensor of the type that includes a coil formed of a plurality of layers of turns of optical fiber encapsulated in a potting material and wound upon the central hub of a spool of the type that includes at least one flange. Such improvement resides in the outer surface of the hub being non-adhesive to the potted coil.

The preceding and additional features and advantages of the present invention will become further apparent from the detailed description that follows. Such description is accompanied by a set of drawing figures. Numerals of the drawing figures, corresponding to those of the written description, point to the various features of the invention. Like numerals refer to like features throughout both the drawing figures and the written description.

BRIEF DESCRIPTION OF THE DRAWINGS

FIG. 1 is a perspective view of a prior art sensor coil of the single flange type wherein the axis of the coil is orthogonal to the plane of the single mounting flange;

FIG. 2 is a perspective view of a prior art coil of the above-described type according to an alternative arrangement for addressing vibration-induced bias error effects;

FIG. 3 is a side elevation view in cross section of a prior art sensor coil in accordance with the preceding figure mounted for use in an inertial navigation system ("INS");

FIGS. 4(a) and 4(b) are bottom plan and side elevation views illustrating details of a prior art spool for supporting a split sensor coil as illustrated in FIGS. 2 and 3, supra;

FIG. 5 is a perspective view of a sensor coil mounted upon a spool in accordance with the invention;

FIG. 6 is a cross-sectional of a spool-and-coil in accordance with the invention taken at line 6—6 of FIG. 5;

DETAILED DESCRIPTION

Figure 7:
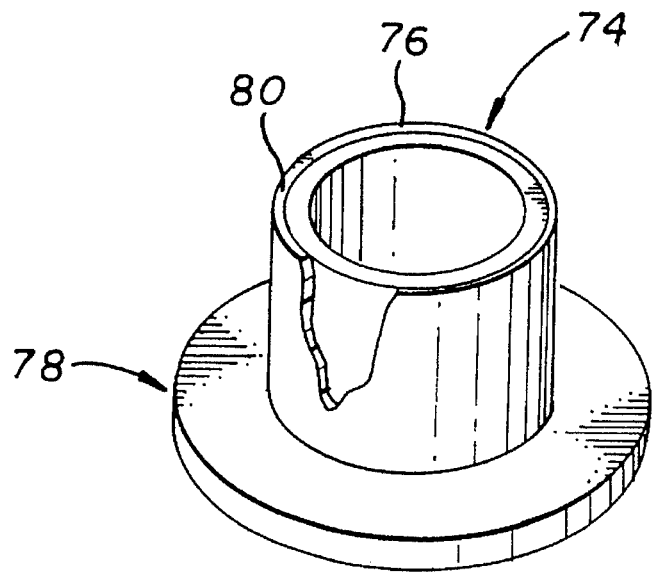
FIG. 7 is a partially broken away perspective view of a spool in accordance with the invention.

FIG. 1 is a perspective view of a sensor coil 10 comprising a plurality of coaxial turns of an optical fiber 12 engaged to a spool in accordance with a prior art sensor coil of the type wherein the axis of the coil 10 is orthogonal to the plane of a single mounting flange 14. The spool comprises the mounting flange 14 in combination with a central cylindrical hub 16. The coil 10 is bonded solely to the single flange 14 and separated from the central hub 16 by a finite distance "d". The free-standing sensor coil 10 is bonded by means of a conventional adhesive layer 18 to the disk-like mounting flange 14 of the spool. The above-described configuration is accomplished by first winding the continuous optical fiber 12 in a predetermined configuration upon another spool of conventional configuration. During the winding process or thereafter the coil 10 is preferably impregnated with a potting material. After such potting material has cured, the wound coil 10 may then be removed from the winding spool, achieving a free standing configuration for fixation to the spool of FIG. 1.

The arrangement shown in FIG. 1 reduces Shupe effect bias that results from temperature-induced stressing of the fiber 12. Such bias is attributed in part to the anisotropic thermal expansion characteristic of potted coils when combined with a spool of conventional configuration comprising a central cylindrical mandrel terminating in opposed end flanges. While the coil is anisotropic with respect to its axial and radial thermal expansions, the spool is isotropic. The anisotropy of the coil is well recognized and follows from the differential stiffnesses of the coil geometry in the axial and radial directions. The coil may be analyzed as a series of concentric rings. When subject to heating, the law of conservation of volume directs the bulk of coil expansion along the coil axis of rotation.

The configuration of FIG. 1 limits the designer's task of matching thermal expansions to consideration of the relationship between the radial coefficient of thermal expansion of the coil 10 and that of the isotropic mounting flange 14 since the spool and the coil are not in axial contact due to the separation d from the hub 16. As such, the coil 10 may expand axially without constraint, eliminating the axial compression-induced stressing that can occur in a spool fixed to a conventional spool. Such stressing results from the substantially larger coefficient of expansion of the coil 10 in the axial direction (relative to the coefficient of the hub or mandrel). Further, by separating the hub 16 from the innermost coil layer, the axial expansion of the coil 10 cannot create stresses at the coil-to-hub "anchor points" that could cause both delamination of the coil from the hub and cracks that propagate through the coil in prior art designs at a forty-five (45) degree angle. Such cracking is observed when the internal stress exceeds the adhesive strength of the bond between the jacket of the fiber coil and the potting material (the axial expansion of a fiber coil mounted to a conventional aluminum spool can create stresses above 500 p.s.i.)

Despite the advantages, in terms of thermal bias sensitivity, realized with a mounting arrangement in accordance with FIG. 1, bias errors are induced in a free-standing coil 10 as in FIG. 1 from another environmental source, vibration. This issue is addressed in the prior art in accordance with the argument disclosed in FIG. 2, a perspective view of an alternative mounted sensor coil. As before, a cylindrical central hub 20 is separated from the inner layer of a potted coil 22 by a finite distance d. The mounting flange 24 of the alternative embodiment is located midway along the length of the hub 20 so that the coil 22 may be arranged into a back half 25 and a front half 26, the "halves" 25 and 26 (actually a misnomer since the division of the coil into two portions needn't be 50—50) being mounted to opposed surfaces of the mounting flange 24. It is a central conceptual advantage of the configuration of FIG. 2 to alleviate the vibration effects that follow from the absence of axial support. The coil 22 (which is somewhat flexible due to the character of known potting materials) is subject, in an axially unsupported arrangement, to stressing in response to unavoidable environmental vibrations. As the coil-and-mounting flange form a cantilevered system, the effects of environmental vibration become most pronounced when the frequency of vibration coincides with the natural or resonant frequency of the cantilevered coil.

The split coil arrangement of FIG. 2 addresses the problem of vibration induced bias. Splitting the coil 22 increases the resonant frequency of each half beyond a threshold (about 2,000 Hz) where environmental disturbances are minimal. (Generally, for certain applications the power spectral density of environmental vibrations is a maximum in the region below 1100 Hz and decreases thereafter. It has been found that a 1 km sensor coil of the type shown in FIG. 1 wound in an orthocyclic pattern and potted in a conventional adhesive material possesses a natural frequency that approximates 1100 Hz.) In the case of the above-referenced 1 km sensor coil, such splitting into halves 24 and 26 of lesser lengths (each comprising about 500 meters of optical fiber), two coil segments are created, each of which possesses a resonant frequency greater than 2400 Hz that removes the coil 22 from the range of significant stressing from environmentally-induced mechanical vibrations.

FIG. 3 is a side elevation view in cross-section of a split coil-and-mounting flange arrangement engaged to a pedestal 28 for operation. As can be seen, the device is contained within a μ-metal shield 30 that interlocks with a base plate 32. Within the casing formed by the shield 30 and the base plate 32, the pedestal 28, preferably formed of stainless steel, receives a bolt 34 that forms a portion of an inertial navigation system (INS). The bolt 34 permits alignment with a predetermined axis that is intended to serve as the input axis of the inertial measurement unit. (Various optical and electrical components are also located within the casing formed by the shield 30.)

The split sensor coil 36 is divided into a front half 38 and a back half 40, each comprising a plurality of turns of a continuous optical fiber. The coil 36 is mounted upon a disk-like member 42 of the mounting flange. An encircling shoulder 44 of the stainless steel pedestal 28 supports a central hub 46 of the spool. (The thinner wall thickness at the lower half of the hub 46 provides added flexibility or "give" in the region of abutting pedestal and spool materials of differing coefficients of thermal expansion to protect from angular misalignment of the disk-like portion 42 when the device is subject to "excessive" thermally-induced radial expansion of the stainless steel pedestal to abut the front half wall of the hub.)

A retainer plate 48 sits atop the back or "thick" half of the hub 46 of the coil mounting spool. The entire assembly is, in turn, secured by means of a second bolt 50 that completes the "sandwich" arrangement including the retainer plate 48, the pedestal 28 and the base plate 32.

The splitting of a sensor coil to overcome vibration effects introduces complexities that increase device costs while reducing yield. The unavoidable fiber transition from one side of a mounting flange to the other complicates both flange design and the coil winding process. The fiber "transition" (i.e. the process of exiting the last turn of the winding pattern at one side of the flange until beginning the first turn of the winding pattern at the opposed side) must be gradual to minimize the introduction of microbends into the coil that can produce optical bias effects. Preferably, the transitions should take place over ¾ of a fiber turn from the end of winding of one half of the split coil to the beginning of winding of the other half of the coil.

FIGS. 4(a) and 4(b) are bottom and side elevation views, respectively, of a spool for supporting a split configuration. As can be seen, the spool 50 generally comprises a disk-like mounting flange 52 joined to a central hub 54 that extends therethrough. As mentioned above, the inner wall thickness of the hub 54 preferably varies along its axial length, reflecting the coupling of the hub 54 to the pedestal (not shown in FIGS. 4(a) and 4(b)).

Slots 56, 58 and communicating arcuate grooves 60 and 62 are carefully machined at the periphery of the disk-shaped member 52 to permit a gradual transition of the fiber between the front and back sections of the sensor coil. The grooves 60 and 62 are provided in the surface of the member 52 upon which the second half of the split coil is wound to guide the fiber to the center of member 52. The split coil may be fabricated or wound upon the mounting flange 50 by first providing a take-up spool that is coaxial with and of greater diameter than the outside diameter of the hub 54. Preferably, a quadrupole winding pattern is employed. After one half of the split coil has been wound upon one side of the disk-like member 54, one must then proceed to the other side to wind the other half of the split coil. Alternatively, the split coil can be wound inwardly from the outer periphery of the disk-shaped member 52. The edge slots 56, 58 and the arcuate grooves 60, 62 are preferably located, dimensioned and designed so that the aforesaid ¾ turn transition can occur.

While a spool including a single mounting flange, rather than a conventional arrangement in which a hub or mandrel and, hence, the coil, is sandwiched between a pair of end flanges, addresses bias errors associated with the coil's anisotropic thermal characteristics, the solution to the attendant vibration-induced bias issues raises other problems. The split coil concept, in addition to complicating the spool structure by requiring the careful machining of grooves at the periphery of the mounting flange, requires a winding process that cannot be readily adapted to automation. This is due to the care with which the fiber must be seated within the peripheral grooves of the mounting flange. As a result, significant yield limitations are associated with split coil configurations. Moreover, the split coil concept is limited to applications for which the input vibration spectrum lies below approximately 2400 Hz.

The inventors herein have addressed the foregoing shortcomings of the prior art whereby the thermal performance advantages of an axially-unconstrained coil are obtained in a design that is readily subject to automation and thereby enjoys attendant economies. Furthermore, this new design is useful for applications for which the input vibration spectrum exceeds 4000 Hz (and is typically below 5000 Hz.)

FIG. 5 is a perspective view of a sensor coil 64 mounted upon a spool in accordance with the invention and FIG. 6 is a cross-sectional view thereof taken at line 6—6 of FIG. 5. Referring to FIGS. 5 and 6, the spool of the invention comprises a central cylindrical hub 66 in combination with a planar mounting flange 68. A layer 69 of an appropriate material (for example, an adhesive) holds one end of the coil 64 to the upper surface of the mounting flange 68. In contrast to free-standing coil arrangements, the innermost layer 70 of the coil 64 is wound upon and in contact with the outer surface 72 of the hub 66. As a consequence, the sensor coil 64 may be formed directly upon the hub or mandrel 66 of the spool of the invention. This simplifies coil winding vis-a-vis arrangements that include a separation distance d between the outer surface 72 of the hub 66 and the innermost layer 70 of the sensor coil 64. In addition, the coil 64 is not free-standing, being fully supported by the central hub or mandrel 66 of the spool. As a result, the coil 64 does not in and of itself constitute an independent structure subject to vibrations near or at its resonant frequency. Rather, it is "anchored" to the spool of the invention both axially (through intimate contact) and radially to form a combined composite structure whose resonant frequency is much higher than that of a free-standing potted coil. The resonant frequency of the composite structure lies well above the range of environmental vibrations previously discussed (i.e. well above 4000 Hz.)

The spool of the invention achieves the aforesaid advantages without incurring bias error effects due to differential radial and axial expansions of the potted sensor coil in the presence of temperature change. This is accomplished by providing a non-adhesive coating at the outer surface 72 of the central mandrel or hub 66 of the spool. FIG. 7 is a partially broken away perspective view of a spool 74 in accordance with the invention. The interior of the cylindrical hub or mandrel 76 (and, for that matter, the mounting flange 78) may be formed of a molded carbon composite material. Alternatively, titanium may be employed for higher accuracy gyro designs.

The exterior of the hub 76 is preferably coated with a layer of material 80 that is non-adhesive (i.e. is characterized by a low coefficient of friction) with respect to the sensor coil wound thereon. Such material may comprise, for example, a polymer such as a mixture of fluorinated ethylene propylene ("FEP") and EPOXY (coefficient of friction approximately 0.12) or tetrafluro ethylene ("TFE") mixed with EPOXY or an equivalent resin (yielding a coefficient of friction of approximately 0.08). The selection of an appropriate coating material 80 will depend upon the characteristics of the composition of the spool as is well understood in the art. Conventional coating processes, including baking, may be employed to provide a sufficiently non-adhesive coating to enable axial expansion of the sensor coil 64 without generating stresses at the interface between the innermost layer 70 of the sensor coil 64 and the outer surface 72 of the central hub or mandrel 66.

Figure 8:
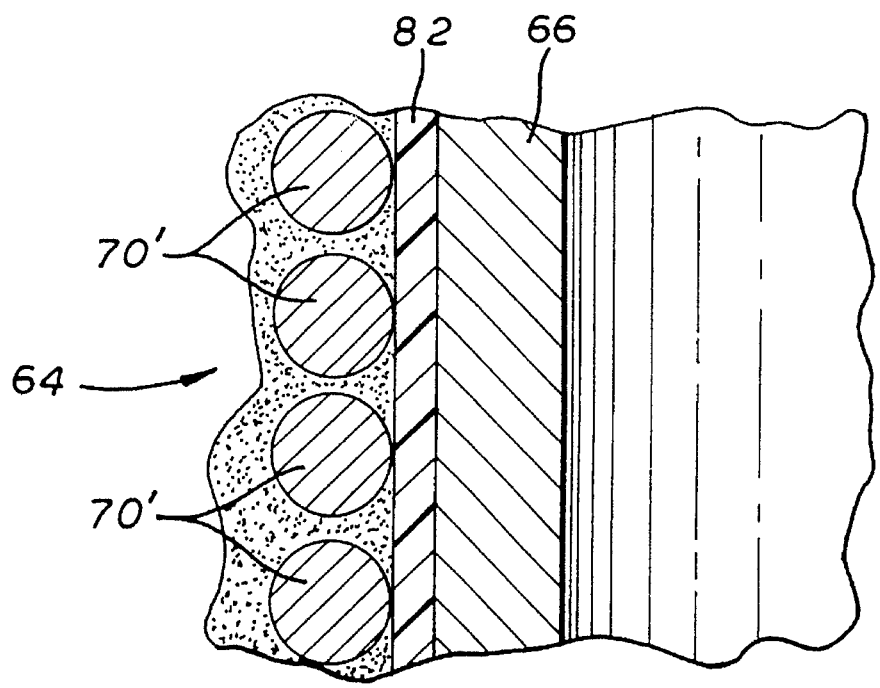
FIG. 8 is a detailed sectional view taken at the interface of a sensor coil and the hub of a spool in accordance with the invention.

FIG. 8 is a detailed sectional view of a portion of the interface between the coil windings 70' of the innermost layer 70 of the potted sensor coil 64 of FIG. 5 and the outer surface of the hub 66 comprising a non-adhesive layer 82. The hub 66 is preferably formed of low-thermal expansion material such as titanium or an appropriate carbon composite. As can be seen, the non-adhesive layer 82 provides a relatively friction-free surface upon which the innermost layer of the sensor coil 64 is free to slide to accommodate its significant axial expansion when subject to heating. The disparity in axial and radial thermal expansions of a potted coil reflects the volumetric expansion and contraction that one may expect to occur as the sensor coil undergoes temperature cycling. The low-thermal expansion material of the spool approximately matches the radial thermally-induced expansion of the potted sensor coil 64 (on the order of 3 to 5 ppm/degree Centigrade). Unlike designs that include a separation distance, the present invention, by providing a non-adhesive surface at the coil-to-hub interface, drastically increases the resonant vibration frequency of the coil structure well beyond the range of vibration inputs, without sacrificing the ability to absorb vastly different degrees of thermal expansion in the radial and axial directions.

Thus it is seen that the present invention provides an easy-to-manufacture device that is readily amenable to mass production. A sensor coil mounted to a spool in accordance with the invention is substantially free of bias errors due to the changing temperatures and the vibration present in the surrounding environment. The simplicity of the spool design, in addition to facilitating automation of the coil winding process, yields a spool that is simple to manufacture and thereby further increases the yield, and lowers the cost, of the resultant device.

While this invention has been described with reference to its presently preferred embodiment, it is not limited thereto. Rather, this invention is limited only insofar as defined by the following set of patent claims and includes all equivalents thereof.

What is claimed is:

1. A rotation sensor for use in a fiber optic gyroscope comprising, in combination:
   a) a spool comprising a substantially-planar mounting flange and a centrally-located substantially cylindrical hub having an outer surface and whose axis of rotation is orthogonal to the plane of said flange;
   b) a continuous optical fiber, said fiber being wound upon said hub in a coil comprising a plurality of layers of coaxial turns embedded in a potting material of preselected composition and including an inner surface whereby said outer surface of said hub is in contact with said inner surface of said coil;
   c) one end of said coil being fixed to a surface of said mounting flange; and
   d) said outer surface of said hub being including a coating layer of material selected so that the coefficient of friction of said outer surface of said hub with respect to said inner surface of said coil is less than or equal to 0.12.

2. A rotation sensor as defined in claim 1 further characterized in that said spool is of molded carbon composite material.

3. A rotation sensor as defined in claim 1 further characterized in that said spool is of titanium.

4. A rotation sensor as defined in claim 1 wherein said coating layer comprises a predetermined polymer.

5. A rotation sensor comprising, in combination:
   a) a substantially cylindrical coil including an inner surface and comprising a plurality of layers of coaxial turns of optical fiber embedded in a potting material;
   b) a spool for mounting said coil, said spool comprising a substantially-planar mounting flange and including a centrally positioned cylindrical hub having an outer surface and an axis of rotation orthogonal to the plane of said flange;

c) the inner surface of said coil being in contact with the outer surface of said hub;

d) one end of said coil being fixed to a surface of said mounting flange; and e) the outer surface of said hub including a coating layer of material selected so that the coefficient of friction of said outer surface of said hub with respect to said inner surface of said coil is less than or equal to 0.12.

6. A rotation sensor as defined in claim 5 further characterized in that said spool is of molded carbon composite material.

7. A rotation sensor as defined in claim 5 further characterized in that said spool is of titanium.

8. A rotation sensor as defined in claim 5 wherein said coating layer comprises a predetermined polymer.

9. In a rotation sensor of the type that includes a coil having an inner surface and formed of a plurality of layers of turns of optical fiber encapsulated in a potting material and wound about the outer surface of a central hub of a spool of the type that includes at least one flange, the improvement comprising the outer surface of said hub being non-adhesive to said inner surface of said potted coil.

10. A rotation sensor as defined in claim 9 wherein one end of said coil is fixed to a surface of said mounting flange.

11. A rotation sensor as defined in claim 10 wherein said outer surface of said hub includes a coating layer of material selected so that the coefficient of friction of said outer surface of said hub with respect to said inner surface of said coil is less than or equal to 0.12.

12. A rotation sensor as defined in claim 11 further characterized in that said spool is of molded carbon composite material.

13. A rotation sensor as defined in claim 11 further characterized in that said spool is of titanium.

14. A rotation sensor as defined in claim 11 wherein said coating layer comprises a predetermined polymer.

* * * * *